Figure 1:
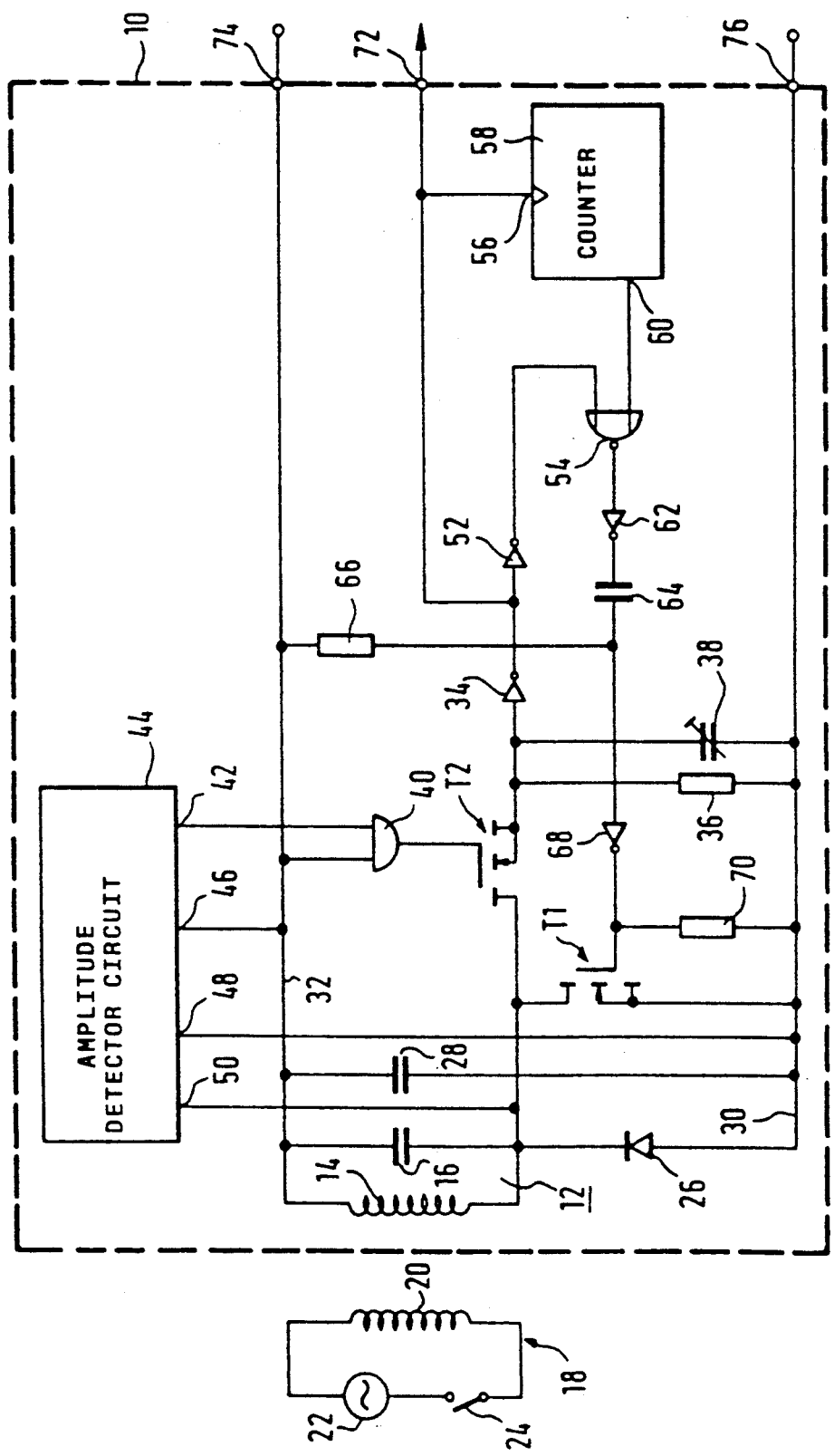

United States Patent [19]

Meier

[11] Patent Number: 5,283,529

[45] Date of Patent: Feb. 1, 1994

[54] OSCILLATION MAINTENANCE CIRCUIT

[75] Inventor: Herbert Meier, Muhlbachbogen, Fed. Rep. of Germany

[73] Assignee: Texas Instruments Deutschland GmbH, Freising, Fed. Rep. of Germany

[21] Appl. No.: 491,009

[22] Filed: Mar. 9, 1990

[51] Int. Cl.$^5$ .................. H03K 3/33; H03K 3/353
[52] U.S. Cl. ........................ 328/223; 328/32; 328/33; 328/59; 307/279; 307/282; 307/350
[58] Field of Search ................ 328/32, 33, 59, 223; 307/279, 282, 289, 350, 354; 310/321

[56] References Cited

U.S. PATENT DOCUMENTS

| | | | |
|---|---|---|---|
| 2,632,853 | 3/1953 | Lindley et al. | 250/36 |
| 3,654,539 | 4/1972 | Schnur et al. | 328/32 |
| 4,041,334 | 8/1977 | Umeda | 328/32 |
| 4,253,095 | 2/1981 | Schwarz et al. | 310/321 |
| 4,511,815 | 4/1985 | Wood | 307/282 |
| 4,952,819 | 8/1990 | Herrmann | 307/282 |

FOREIGN PATENT DOCUMENTS

3514942A1 10/1986 Fed. Rep. of Germany .
2163324 2/1986 United Kingdom .

Primary Examiner—William L. Sikes
Assistant Examiner—Terry D. Cunningham
Attorney, Agent, or Firm—Rebecca A. Mapstone; James C. Kesterson; Richard L. Donaldson

[57] ABSTRACT

A circuit arrangement is described for generating pulses for maintaining the oscillations of a resonance circuit after termination of an outside stimulation of the oscillations by means of an HF carrier oscillation. The circuit arrangement comprises an energy storage element (28) chargeable by the HF carrier oscillation to a supply voltage value. An amplitude detector circuit (44) serves to generate a trigger circuit when the oscillation amplitude of the resonance circuit (12) drops beneath the supply voltage value. A first switching element (T2) supplies the oscillations of the resonance circuit (12) under the control of the trigger signal to a delay circuit (34, 53, 58, 54, 62, 68) which at its output furnishes switching pulses with a predetermined phase position with respect to the oscillations of the resonance circuit (12). A second switching element (T1), for the duration of each switching pulse, enables the supply of energy from the energy storage element (28) to the resonance circuit (12).

5 Claims, 2 Drawing Sheets

OSCILLATION MAINTENANCE CIRCUIT

The invention relates to a circuit arrangement for generating pulses for maintaining the oscillations of a resonance circuit after termination of an outside excitation of the oscillations by means of an HF carrier oscillation.

Transponder systems exist in which an interrogator cooperates with a responder which does not contain its own power supply but draws its energy from an HF interrogation pulse transmitted by the interrogator. The HF interrogation pulse stimulates a resonance circuit to oscillate in the responder and an energy store is provided which is charged by rectification of the oscillations. The task of the responder is to transmit a message back to the interrogator after termination of the HF interrogation pulse, said message containing informative data, for example an identification code group which permits a clear identification of the responder which sent back the message. For sending back the message a clock signal is required under the control of which the message transmission operation takes place. Said clock signal can be recovered from the oscillations of the resonance circuit which even after termination of the HF interrogation pulse, depending on its quality continues to oscillate for a greater or lesser time. Without special measures, even with high circuit quality of the resonance circuit only very short messages could be sent back to the interrogator because the oscillations of the resonance circuit decay too quickly and clock signals are thus available only for a relatively short time. Restriction to short messages is however undesirable because in the case of the transponder system outlined only a small number of responders, with each of which an own identification code group is associated, can then cooperate with the interrogator. To make it possible to operate with a large number of responders messages may be transmitted which are made up of a relatively large number of bits.

The problem underlying the invention is to provide a circuit arrangement of the type mentioned at the beginning which makes it possible to maintain the oscillations of a resonance circuit after decaying of an outside excitation for a longer period of time than the resonance circuit would continue to oscillate solely due to its circuit quality.

According to the invention this problem is solved by an energy storage element chargeable by the HF carrier oscillation to a supply voltage value, an amplitude detector circuit for generating a trigger signal when the oscillation amplitude of the resonance circuit drops below the supply voltage value, a first switching element which under the control of the trigger signal supplies the oscillations of the resonance circuit to a delay circuit which furnishes at its output switching pulses having a predetermined phase position with respect to the oscillations of the resonance circuit, and a second switching element which for the duration of each switching pulse enables the supply of energy from the energy storage element to the resonance circuit. With the aid of the circuit arrangement according to the invention whenever its oscillation amplitude begins to drop the resonance circuit is briefly supplied with energy from the energy storage element so that the resonance circuit can continue to oscillate. The delay circuit ensures that the energy supply takes place at the correct instant so that a self-excitation results as is necessary for the further oscillating. The resonance circuit can therefore continue to oscillate as long as enough energy is present in the energy storage element. Due to the prolongation achieved of the period during which the resonance circuit oscillates when using the circuit arrangement according to the invention in a transponder system longer messages can be sent back by a responder to an interrogator because the clock signals required for the sending back can be derived for this longer period from the oscillations of the resonance circuit.

Advantageous further developments of the invention are characterized in the subsidiary claims.

Figure 2:
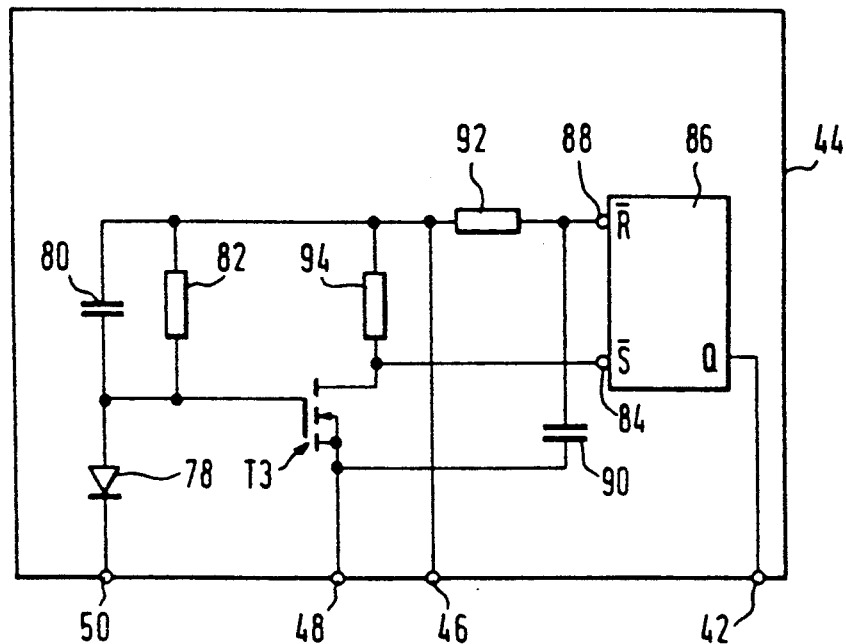

The invention will now be explained by way of example with the aid of the drawings, wherein:

FIG. 1 shows a circuit diagram of the circuit arrangement according to the invention and FIG. 2 shows an example of a circuit for detecting completion of the carrier oscillation stimulating the resonance circuit.

The circuit arrangement 10 illustrated in FIG. 1 contains a resonance circuit 12 having a coil 14 and a capacitor 16. This resonance circuit 12 can be stimulated to oscillate by means of a carrier oscillation which is generated by a transmitter 18 indicated symbolically in FIG. 1 and irradiated at a coil 20 of said transmitter 18. For generating the carrier oscillation, the transmitter 18 includes an HF generator 22 which with the aid of a switch 24 can be connected to the coil 20.

The oscillations of the resonance circuit 12 are rectified by a diode 26 and the rectified voltage is stored in a capacitor serving as energy storage element. In the charged state the capacitor 28 furnishes the supply voltage for the components and assemblies contained in the circuit arrangement 10. The line 30 is the ground line and the line 32 is the supply voltage line. Connected to the cathode of the diode 26 is the drain electrode of an MOS field-effect transistor T1, the source electrode of which is connected to the ground line 30. Also connected to the cathode of said diode 26 is the drain electrode of a further MOS field-effect transistor T2 of which the source electrode is connected to the input of a negator 34. Between the input of the negator 34 and the ground line 30 there is a resistor 36 and a trimmer capacitor 38. Connected to the gate electrode of the MOS field-effect transistor T2 is the output of an AND circuit 40 which is connected with one input to the supply voltage line 32 and with the other input to an output 42 of an amplitude detector circuit 44. The amplitude detector circuit 44 also comprises an input 46 connected to the supply voltage line 32, an input 48 connected to the ground line 30 and an input 50 connected to the connection point between the resonance circuit 12 and the anode of the diode 26.

The output of the negator 34 is connected to the input of a further negator 52 of which the output is connected to an input of a NOR circuit 54. In addition the output of the negator 34 is connected to the counting input 56 of a counter 58 of which the output 60 is connected to the second input of the NOR circuit 54. The output of the NOR circuit is connected to the input of a further negator 62 which is connected to a terminal of a capacitor 64. The second terminal of the capacitor is in connection via a resistor 66 with the supply voltage line 32 and is moreover connected to the input of a negator 68 of which the output is connected to the gate electrode of the MOS field-effect transistor T1. Between the gate electrode of said MOS field-effect transistor T1 and the ground line 30 there is a resistor 70.

The circuit arrangement 10 operates as follows:

To enable the circuit arrangement 10 to become active and emit clock pulses at its output 72 the resonance circuit 12 must be stimulated to oscillate. This is done in that the switch 24 of the only schematically illustrated transmitter 18 is closed so that the HF carrier oscillations generated by the HF generator 22 reach the coil 20 and are irradiated by the latter. Due to inductive coupling the resonance circuit 12 tuned to the frequency of the carrier oscillation is stimulated to oscillate. By means of the diode 26 the oscillations are subjected to a half-wave rectification and as a result the capacitor 28 is charged to half the amplitude of the carrier oscillation. The energy stored in the capacitor 28 is used as supply energy for the rest of the circuit as soon as the carrier oscillation ceases after opening of the switch 24.

The amplitude detector circuit 44 detects both the start of the carrier oscillation and the end thereof. An example of the makeup of such an amplitude detector circuit is shown in FIG. 2. The corresponding description will follow later. As long as the carrier oscillation is emitted by the transmitter 18 and the capacitor 28 is fully charged the supply voltage at the supply voltage line 32 does not drop but remains constant. The amplitude detector circuit which reacts to a reduction of the amplitude of the oscillations present at the resonance circuit 12 furnishes in this case a signal with a low value at its output 42 which results in a signal with low value being present at the gate electrode of the MOS field-effect transistor T2 as well so that said transistor is kept nonconductive. Since the input of the negator 68 is held via the resistor 66 at the supply voltage value and the output of said negator 68 and thus also the gate electrode of the MOS field-effect transistor T1 is connected to ground via the resistor 70, said transistor is likewise is nonconductive and this means that the resonance circuit 12 is practically separated from the rest of the circuit so that in the charging phase of the capacitor 28 no current is consumed by the rest of the circuit, apart from leakage currents. The energy transmitted by the transmitter 18 and received by the resonance circuit 12 is thus used in optimum manner for building up the voltage at the capacitor 28.

After a predefined period of time the switch 24 is opened so that no more carrier oscillations can be received by the resonance circuit 12. The oscillations of the resonance circuit therefore become smaller in amplitude and in accordance with the quality of the resonance circuit they would approach zero aperiodically at a greater or lesser rate if the effect of the remaining components and assemblies in the circuit arrangement 10 did not occur. The amplitude detector circuit 44, which is connected via the input 50 to the resonance circuit 12 and via the input 46 to the supply voltage line 32, detects that the oscillation amplitude starts to drop with respect to the supply voltage value at the supply voltage line 32. As reaction to this detection the amplitude detector circuit 44 furnishes at its output 42 a signal with the value "1" which passes to the input of the AND circuit 40. Since at the other input of said AND circuit 40 the supply voltage is present, representing the signal value "1", a high signal value also appears at the output of the AND circuit 40 and leads to the MOS field-effect transistor T2 becoming conductive. The MOS field-effect transistor T2 therefore switches the negative half-waves of the oscillations of the resonance circuit 12 through to the input of the negator 34 which exerts a certain limiting effect on said half-waves so that at its output an approximately rectangular pulse-like signal appears which is supplied to the output "/2 of the circuit arrangement 10 and in further circuit units not illustrated can be used as clock signal. In addition, the signal passes from the output of the negator 34 via the negator 52 to the input of the NOR circuit 54 and to the counting input 56 of the counter 58. Said counter 58 is set so that after receiving a predetermined number of pulses at the counting input 56 it furnishes at its output 60 a pulse which by logic combination with the output signal of the negator 52 in the NOR circuit 54 leads to emission of an output signal at said NOR circuit 54 which passes via the further negator 62 to the capacitor 64. The capacitor 64 and the resistor 66 act as differentiating member which from the negative edge of the output signal of the negator 62 forms a needle pulse which via the negator 68 briefly renders the MOS field-effect transistor T1 conductive. The conductive state of the MOS field-effect transistor T1 leads to the oscillation of the resonance circuit 12 usually symmetrical about the supply voltage being momentarily drawn to ground and as a result for this short period, energy is supplied to the resonance circuit 12 from the capacitor 28 so that it can continue to oscillate with full amplitude.

The delay which the signal derived from the negative half-wave of the oscillations of the resonance circuit undergoes along the path through the negators 34 and 52, the NOR circuit 54 and the negators 62 and 68 can be defined by setting the trimmer capacitor 38 so that the needle pulse which momentarily supplies energy again to the resonance circuit 12 from the capacitor 28 occurs exactly in the minimum of the half-wave of the oscillation of the resonance circuit so that the energy supply takes place in the sense of a self-excitation which has the desired effect of stimulating the oscillations.

Fundamentally, it would also be possible to omit the counter 58 and thereby supply to the resonance circuit 12 in each oscillation period a stimulation pulse which supplies energy thereto so that the decay of the oscillation does not occur until the energy stored in the capacitor 28 is consumed. This is however not necessary because due to its quality the oscillating circuit also continues to oscillate for a certain period of time when no stimulation energy is supplied thereto. The counter 58 can for example be so set that it counts each time up to 8 before emitting at its output 60 a signal which via the NOR circuit 54 then leads to a stimulation pulse being supplied to the resonance circuit 12. This means that the resonance circuit 12 receives a stimulation pulse after every eight oscillations periods. The number "8" is chosen so that the oscillation of the resonance circuit after seven oscillation periods still suffices to generate an evaluatable clock pulse at the output 72. In the course of the eighth oscillation period a stimulation pulse is then supplied which raises the oscillation of the resonance circuit 12 again to the maximum amplitude.

Due to the generation of the stimulation pulses for the resonance circuit 12 even without outside excitation the latter can oscillate for substantially longer than would be the case due solely to its circuit quality. The length of time for which the oscillation can be maintained depends on the energy stored in the capacitor 28 and of course also on the energy consumption of the circuit units connected to the output 714.

An example of embodiment of the amplitude detector circuit 44 is shown in FIG. 2. It is pointed out that as amplitude detector circuit 44 any circuit can be used which has the ability of determining the start and end of a carrier oscillation and indicating this with the aid of a corresponding signal.

Connected to the input 50 is a diode 78 to the anode of which a capacitor 80 and a resistor 82 parallel to the latter is connected. Also connected to the anode of the diode 78 is the gate electrode of an MOS field-effect transistor T3, the source electrode of which is connected via the input 48 to the ground line 30. The drain electrode of the MOS field-effect transistor 73 is connected to the setting input 84 of the flip-flop 86 of which the output forms the output 42 of the amplitude detector circuit 44. A capacitor 90 lies between the source electrode of the MOS field-effect transistor T3 and the resetting input 88. The supply voltage line 32 is connected via the input 46 to one end of a resistor 92, the other end of which is connected to the resetting input 88 of the flip-flop 86. A further resistor 94 lies between the drain electrode of the MOS field-effect transistor T3 and the connection point between the capacitor 80, the resistor 82 and the resistor 92.

When the switch 24 of the symbolically illustrated transmitter 18 is closed the coil 14 of the resonance circuit 12 receives an HF carrier oscillation which passes via the input 50 to the amplitude detector circuit 44 and is subjected by the diode 78 to a half-wave rectification. As has been explained above the voltage at the supply voltage line 32 begins to rise with the charging of the capacitor 28. The flip-flop 86 which like the other circuit units of the circuit arrangement described is connected to the supply voltage line 32 and the ground line 30 receives via the capacitor 90 at the resetting input 88 a pulse derived from the rise of the supply voltage and as a result the flip-flop 86 is moved to the reset state. In this state the flip-flop furnishes a signal with low value at the output 42. Said signal with low value blocks the AND circuit 40 and thus also the MOS transistor T2 as has been explained above. During the presence of the carrier oscillation the gate electrode of the MOS field-effect transistor T3 is held at ground potential so that said field-effect transistor is nonconductive. With the end of the HF carrier oscillation the voltage at the gate electrode of the MOS field-effect transistor T3 rectified by the diode 78 begins to drop. However, due to the storage effect of the capacitor 28 the voltage at the supply voltage line 32 remains constant so that the voltage at the gate electrode of the MOS field-effect transistor T3 begins to rise. This transistor is therefore moved to the conductive state and as a result at the setting input 84 of the flip-flop a signal with low voltage value appears. The setting input 84 of the flip-flop is formed so that it reacts to the application of a signal with low value and effects switching over of the flip-flop 86 to the set state. As a result, at the output 42 of the amplitude detector circuit 44 a signal with high value appears and passes to the AND circuit 40.

Said AND circuit thereupon likewise furnishes at its output a signal with high value which renders the MOS field-effect transistor T2 conductive. Thus, the amplitude detector circuit furnishes both at the start of the HF oscillation circuit and at the end thereof a definite output signal at the output 42 which is used in the manner described above for controlling the generation of the stimulation pulses for the resonance circuit 12.

I claim:

1. A circuit arrangement for generating pulses for maintaining an oscillation amplitude of a resonance circuit for a predetermined time after termination of an outside excitation of the resonance circuit by means of HF carrier oscillation signals comprising:

said resonance circuit for receiving said HF carrier oscillation signal and providing an output signal and a resonant oscillation signal;

an energy storage element connected to said resonance circuit, chargeable by said output signal to a supply voltage value, for supplying energy to other circuits;

an amplitude detector circuit connected to said energy storage element and said resonance circuit for generating a trigger signal when the amplitude of said resonant oscillation signal drops below said supply voltage value;

a first switching element for supplying said resonant oscillational signal of said resonant circuit to a delay circuit, in response to said trigger signal;

said delay circuit for furnishing switching pulses, having a predetermined phase position with respect to said resonant oscillation signal of said resonant circuit and a predetermined duration, to a second switching element;

said second switching element for energizing said resonance circuit via said energy storage element for the duration of said switching pulses.

2. A circuit arrangement according to claim 1, wherein advancing pulses are derived from said resonant oscillation signal of said resonance circuit.

3. A circuit arrangement according to claim 2, wherein said delay circuit comprises:

a counter for furnishing an enable signal in response to having received a predetermined number of said advancing pulses.

4. A circuit arrangement according to claim 3, wherein said delay circuit comprises a plurality of series connected delay members and wherein said counter is one of the delay members.

5. A circuit arrangement according to claim 3, wherein said amplitude detector circuit comprises a flip-flop, having a set state, which receives a setting signal in response to said amplitude of said resonant oscillation signal of the resonance circuit dropping below said supply voltage value and furnishes and trigger signal in the set state.

* * * * *